United States Patent

[11] 3,580,560

| | | | |
|---|---|---|---|
| [72] | Inventors | Jacques Jarret<br>Le Vesinet;<br>Jean Jarret, Fourqueux, France | |
| [21] | Appl. No. | 800,227 | |
| [22] | Filed | Feb. 18, 1969 | |
| [45] | Patented | May 25, 1971 | |
| [73] | Assignee | Societe D'Exploitation Des Ressorts Auto-<br>Amortisseurs Jarret<br>Paris, France | |
| [32] | Priority | Feb. 19, 1968 | |
| [33] | | France | |
| [31] | | 140,375 | |

[54] RESILIENT DEVICES
4 Claims, 1 Drawing Fig.

[52] U.S. Cl. .................................................. 267/153

[51] Int. Cl. ......................................................... F16f 1/37
[50] Field of Search........................................... 267/141,
140, 143, 145, 152, 153, 182, 63

[56] References Cited
UNITED STATES PATENTS
2,656,182  10/1953  Willison ...................... 267/63

Primary Examiner—James B. Marbert
Attorney—Marn & Jangarathis

ABSTRACT: This invention is concerned with a compression spring in which an elastomeric mass is confined in a chamber whose volume is variable without any sliding joint, the chamber including a toric portion enclosing a cylindrical portion whose height is small compared to its diameter.

Patented May 25, 1971  3,580,560
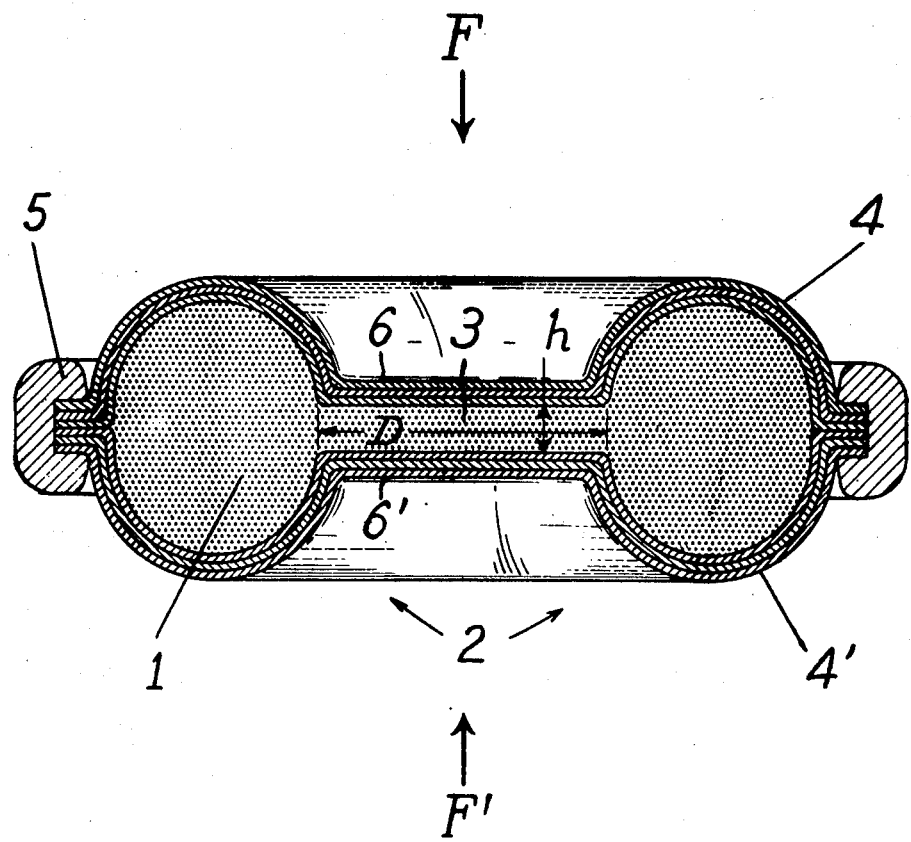

RESILIENT DEVICES

This invention relates to hydrostatic compression springs.

It is known that:

1. If a high pressure from 1,000 to 10,000 bars is applied to an elastomer contained in a variable-volume chamber, a considerable amount of mechanical energy can be stored.

2. A spring based on this principle is adapted to give a considerable shock-absorbing effect if the deformation of the chamber results in an uneven compression of the elastomer.

3. It is advantageous that the variation in the volume of the chamber should be obtained without any sliding joint and hence without solid friction, sealing thus being obtained indefinitely under good conditions.

It is difficult, however, to construct a perfectly resilient deformable chamber which at the same time can withstand a high internal pressure and impart to the elastomer a volume variation corresponding to a large relative displacement of the points of application of opposite external forces.

The present invention relates to a spring employing hydrostatic compression of an elastomer, wherein the deformable chamber, without any sliding joint, is a casing formed so as to allow considerable deformation while being able to withstand high pressures.

According to the invention, the said chamber comprises a toric annular part enclosing a cylindrical central part, the height of the cylinder being small in relation to the diameter of the toric assembly before deformation of the casing under the action of a force exerted along the axis of the cylinder and tending to flatten it on itself.

A casing of this type is preferably made by peripherally joining two symmetrical half-members, each formed by stacking a plurality of layers of high-strength material.

The thin layers superimposed to form the half-members are generally of metal having a high elastic limit, and more particularly steel, each layer preferably being separated from the next by a film of lubricant, e.g. a solid lubricant such as molybdenum disulfide.

The accompanying drawing is a diagrammatic section of a spring employing the hydrostatic compression of an elastomer, constructed according to the invention.

As explained hereinbefore, the chamber containing the elastomer 1 consists of a torus 2 covering a cylindrical central part 3 of a height $h$ connected at its periphery to the annular part of the torus 2.

The chamber is formed by two halves 4 and 4' which are applied face to face and connected at their edge by a peripheral collar 5 formed, for example, by a steel ring, the lips of which will be inwardly deformed in order that the periphery of each half may be firmly applied against the periphery of the matching half.

Each half comprises a hollow portion forming half the generatrix of the torus 2 connected to a disc 6 and 6' respectively of diameter D forming one of the two cylinder ends 3. The halves are made from a number of layers of material (generally from two to 20 layers) bearing against one another but adapted to undergo slight sliding movement without any damage to the contacting layers. By way of example, each half may consist of five layers of sheet steel disposed one upon the other and separated by a thin layer of solid lubricant.

When the two opposite halves are put into position, the space contained between them will be entirely filled by the elastomer material 1, the volume of which will be very slightly greater than the inside volume defined by the casing formed by the two assembled halves.

The resultant system forms a spring employing hydrostatic compression of an elastomer. If counteracting forces F-F' are applied, which tend to bring the flat central discs 6 and 6' towards one another, the capacity of the casing is reduced, the volume of the elastomer is reduced, and the internal pressure increases. The resilient deformation of the half-member may be considerable since each layer of material forming the complete chamber is very thin and the plurality of such layers of material withstands the high internal pressure resulting from the reduction of the volume, without any permanent deformation.

It will also be found that the compression of the elastomer is not uniform and, in particular, the cylindrical part 3 will undergo a considerable variation in volume as a result of the two discs 6 and 6' approaching one another while the toric parts will undergo only a very slight variation in volume so that on each compression part of the elastomer will move from the center of the casing towards the outer toric part. When the compression forces F-F' cease to act, the elastomer will flow back from the toric part towards the central part and provide a shock-absorption the magnitude of which will depend firstly on the composition of the elastomer and secondly on the relative dimensions of the central cylindrical portion and the outer toric portion of the casing.

Of course the invention is not limited to the above-described spring but relates to any casings formed by multiple half-members, and more particularly springs formed by combining a number of multiple-diaphragm casings in series or parallel.

I claim:

1. A resilient device which comprises a casing and an elastomeric mass, said casing defining a chamber enclosing said elastomeric mass, the volume of said chamber being variable by deformation, said chamber having an outer toric portion and an inner cylindrical portion, the height of the cylindrical portion being smaller than the height of the outer toric portion whereby deformation of the chamber results in a greater relative variation in the volume of said inner cylindrical portion than of said outer toric portion.

2. The device as defined in claim 1 wherein the casing is formed by two symmetrical half-members which are juxtaposed and rigidly connected at their periphery.

3. The device as defined in claim 2, wherein each half-member consists of a stack of a number of layers of high-strength material adapted to slide on one another.

4. The device as defined in claim 3, wherein a thin layer of a solid lubricant is interposed between adjacent layers.